United States Patent
Lee et al.

(10) Patent No.: US 11,588,808 B2
(45) Date of Patent: *Feb. 21, 2023

(54) OPERATING SYSTEM WITH AUTOMATIC LOGIN MECHANISM AND AUTOMATIC LOGIN METHOD

(71) Applicant: GoTrustID Inc., Irvine, CA (US)

(72) Inventors: Darren Tien-Chi Lee, Irvine, CA (US); Minglian Chen, Wheeling, IL (US); Jeng-Lung Li, Taichung (TW); Yi-Kai Wang, Taichung (TW)

(73) Assignee: GoTrustID Inc., Irvine, CA (US)

( * ) Notice: Subject to any disclaimer, the term of this patent is extended or adjusted under 35 U.S.C. 154(b) by 272 days.

This patent is subject to a terminal disclaimer.

(21) Appl. No.: 16/944,167

(22) Filed: Jul. 31, 2020

(65) Prior Publication Data
US 2021/0136056 A1    May 6, 2021

Related U.S. Application Data

(60) Provisional application No. 62/929,654, filed on Nov. 1, 2019.

(51) Int. Cl.
*H04L 9/40* (2022.01)
*H04L 9/32* (2006.01)

(52) U.S. Cl.
CPC ........ *H04L 63/0823* (2013.01); *H04L 9/3213* (2013.01); *H04L 9/3228* (2013.01); *H04L 63/0853* (2013.01); *H04L 63/0861* (2013.01)

(58) Field of Classification Search
CPC . H04L 9/3213; H04L 9/3228; H04L 63/0853; H04L 63/0861; H04L 63/0823
See application file for complete search history.

(56) References Cited

U.S. PATENT DOCUMENTS

| | | | |
|---|---|---|---|
| 10,075,847 B1* | 9/2018 | Moreton | H04L 63/083 |
| 10,474,804 B2* | 11/2019 | Lee | H04L 9/3231 |
| 2016/0285633 A1* | 9/2016 | Allinson | H04L 63/0853 |
| 2017/0026830 A1* | 1/2017 | Singh | H04L 63/107 |

(Continued)

FOREIGN PATENT DOCUMENTS

| | | | |
|---|---|---|---|
| CN | 105376208 A | * | 8/2014 |
| CN | 105376208 B | * | 8/2014 |

(Continued)

*Primary Examiner* — Lynn D Feild
*Assistant Examiner* — Saad Ahmad Abdullah
(74) *Attorney, Agent, or Firm* — JCIPRNET

(57) ABSTRACT

An operating system with automatic login mechanism and an automatic login method are provided. The operating system includes a first electronic device, a second electronic device and a server device. The second electronic device includes a biometric sensor. When a login event of the first electronic is triggered, the first electronic device sends a login request to the second electronic device directly or via the server device, so that the second electronic device performs a biometric verification by the biometric sensor according to the login request. When the biometric verification is passed, the second electronic device sends a first login credential to the first electronic device directly or via the server device, so that the first electronic device performs an automatic login operation of the first electronic device according to the first login credential.

20 Claims, 7 Drawing Sheets

(56) References Cited

U.S. PATENT DOCUMENTS

| | | | | |
|---|---|---|---|---|
| 2019/0246273 A1* | 8/2019 | Zhou | ................... | H04W 12/30 |
| 2020/0145219 A1* | 5/2020 | Sebastian | ................ | G06F 21/32 |
| 2020/0235932 A1* | 7/2020 | Gehrmann | ............ | H04L 9/3213 |
| 2022/0046099 A1* | 2/2022 | Correa Azzolin | .... | H04L 67/148 |

FOREIGN PATENT DOCUMENTS

| | | | | | |
|---|---|---|---|---|---|
| CN | 106796630 A | * | 9/2014 | | |
| CN | 104917755 A | * | 5/2015 | | |
| CN | 106796630 A | * | 5/2017 | ............ | G06F 21/31 |
| WO | WO 2016107805 A1 | * | 12/2014 | | |

* cited by examiner

OPERATING SYSTEM WITH AUTOMATIC LOGIN MECHANISM AND AUTOMATIC LOGIN METHOD

CROSS-REFERENCE TO RELATED APPLICATION

This application claims the priority benefit of U.S. provisional application Ser. No. 62/929,654, filed on Nov. 1, 2019. The entirety of the above-mentioned patent application is hereby incorporated by reference herein and made a part of this specification.

BACKGROUND

Technical Field

The disclosure relates to a system, and particularly relates to an operating system with automatic login mechanism and an automatic login method.

Description of Related Art

With the popularity of various computer devices, the computer devices have been widely used to handle personal affairs, business affairs or industrial affairs. In this regard, the computer device may store highly private or highly confidential information, so ordinary computer devices usually have a login mechanism. The user must enter a correct user account and a login password to login to the computer device for use. However, due to phishing programs and computer viruses are highly rampant, the login mechanism using the login password to authenticate a user can no longer provide sufficient security for the computer device. For example, once the user is incautious, a backdoor program (for example, a Trojan horse) is planted in a computer very easily. As a result, the login password for the computer is logged and stolen by a malicious person such as a hacker. Personal data or confidential information stored on the computer further leaks consequently, or even the control right of the computer is acquired by the malicious person. Although, some improved login mechanisms have been proposed, such as a built-in fingerprint login mechanism in the computer or using a mobile phone to connect to the computer for Bluetooth communication verification. However, when the user changes the computer, the user must re-enter complicated fingerprint registration, or when the communication quality of the mobile phone and the computer is poor or cannot support Bluetooth communication authentication, it is easy to cause the user to fail to log in the computer effectively. Therefore, regarding how to provide a secure login function and a convenient login mechanism, solutions of several embodiments are provided below.

SUMMARY

The disclosure is directed to an operating system with automatic login mechanism and an automatic login method, and can provide an effectively automatic login operation.

An operating system with automatic login mechanism of the disclosure includes a first electronic device, a second electronic device and a server device. The second electronic device is coupled to the first electronic device, and comprising a biometric sensor. The server device is coupled to the first electronic device and the second electronic device. When a login event of the first electronic is triggered, the first electronic device sends a login request to the second electronic device directly or via the server device, so that the second electronic device performs a biometric verification by the biometric sensor according to the login request. When the biometric verification is passed, the second electronic device sends a first login credential to the first electronic device directly or via the server device, so that the first electronic device performs an automatic login operation of the first electronic device according to the first login credential.

An automatic login method of the disclosure includes the following steps: sending a login request to the second electronic device directly or via the server device by the first electronic when a login event of the first electronic is triggered; performing a biometric verification by the second electronic device according to the login request; sending a first login credential to the first electronic device directly or via the server device by the second electronic device when the biometric verification is passed; and performing an automatic login operation of the first electronic device by the first electronic device according to the first login credential.

Based on the above, according to the operating system with automatic login mechanism and the automatic login method of the disclosure, the user can log in to an electronic device by the biometric verification on another electronic device to achieve the password-free login function.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "electrically connected," and variations thereof herein are used broadly and encompass direct and indirect connections, couplings, and mountings.

Figure 1:
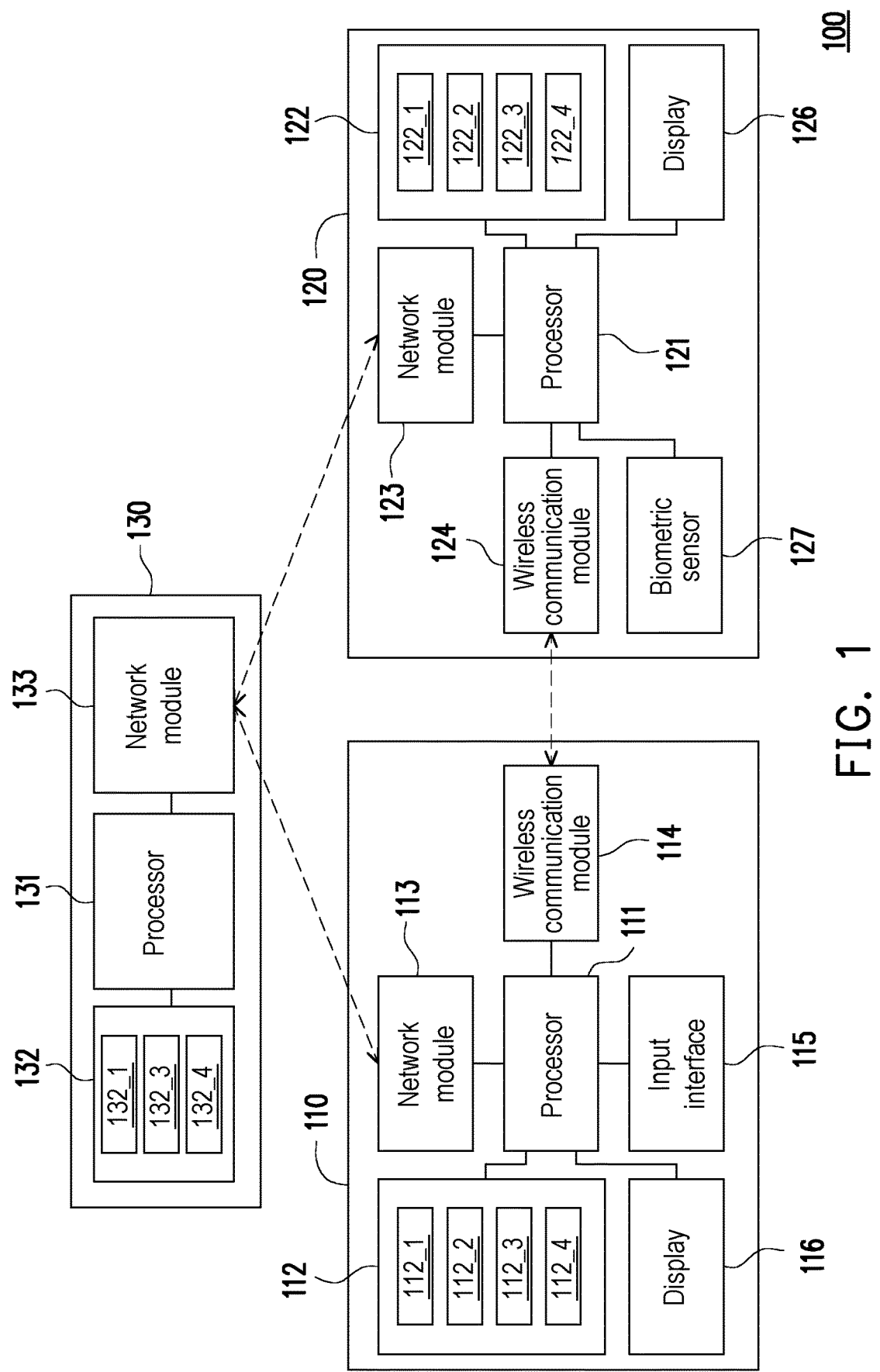
FIG. 1 is a schematic diagram illustrating an operating system according to an embodiment of the disclosure.

FIG. 1 is a schematic diagram illustrating an operating system according to an embodiment of the disclosure. Referring to FIG. 1, the operating system 100 includes a first electronic device 110, a second electronic device 120 and a server device 130. The first electronic device 110 includes a processor 111, a memory 112, a network module 113, a wireless communication module 114, an input interface 115, and a display 116. The processor 111 is electrically connected to the memory 112, the network module 113, the wireless communication module 114, the input interface 115, and the display 116. The second electronic device 120 includes a processor 121, a memory 122, a network module 123, a wireless communication module 124, a display 126, and a biometric sensor 127. The processor 121 is electrically connected to the memory 122, the network module 123, the wireless communication module 124, the display 126, and the biometric sensor 127. The server device 130 includes a processor 131, a memory 132, and a network module 133. The processor 131 is electrically connected to the memory 132 and the network module 133.

In the embodiment of the disclosure, the first electronic device 110 may be a computer device, such as a desktop computer, a notebook computer, or a workstation computer. The second electronic device 120 may be a wearable device or a mobile device with biometric verification function, such as a smart watch, a mobile phone, a personal digital assistant (PDA), a laptop computer, or a tablet computer. The server device 130 may be a server computer, a station server, or a cloud server. In the embodiment of the disclosure, the network modules 113 and 123 of the first electronic device 110 and the second electronic device 120 may respectively communicate with the network module 133 of the server device 130 through the internet (e.g., a local area network (LAN) or an internet protocol (IP) network), and the network modules 113, 123, and 133 may include a network interface card respectively. The wireless communication module 114 of the first electronic device 110 may communicate with the wireless communication module 124 of the second electronic device 120, and the wireless communication modules 114 and 124 may respectively include a wireless communication circuit or interface. In the embodiment of the disclosure, the wireless communication module 114 and 124 may be a Bluetooth communication module or a Wi-Fi communication module.

In the embodiment of the disclosure, the user may respectively pre-store the application programs or software into the memories 112, 122, and 132 of the first electronic device 110, the second electronic device 120, and the server device 130. Specifically, in the embodiment of the disclosure, the memory 112 of the first electronic device 110 may store an application program including an identity management module 112_1, a credential management module 112_2, a major logic control module 112_3, and a secure storage module 112_4. The identity management module 112_1 is configured to manage the verification of user's identity, so as to only approve the user can access the application program in the first electronic device 110. The credential management module 112_2 is configured to manage the credential, so as to manage how the user or device to login to the first electronic device 110. The major logic control module 112_3 is a core component of the application program, and configured to handle all data flow and processing logic during the registration operation and the login operation.

In the embodiment of the disclosure, the memory 122 of the second electronic device 120 may store an application program including an identity management module 122_1, a credential management module 122_2, a major logic control module 122_3, and a secure storage module 122_4, and the processor 121 of the second electronic device 120 may execute the above modules to perform the functions similar to or corresponding to the above modules executed by the processor 110. The memory 132 of the server device 130 may store an application program including an identity management module 132_1, a major logic control module 132_3, and a secure database 132_4, and the processor 131 of the server device 130 may execute the above modules to perform the functions similar to or corresponding to the above modules and modules executed by the processor 110. The secure database 132_4 is configured to securely store and protect user's information in its database.

For example, the display 116 of the first electronic device 110 may display a registration interface, and the user may perform the registration operation on the first electronic device 110. For example, the user may input a user account and a login password through the input interface 115. The input interface 115 may be a keyboard, a mouse, or a touch panel, and the present disclosure is not limited thereto. The identity management module 112_1 may handle the user account and the login password, and the credential management module 112_2 may send a registration request to the server device 130. Then, the identity management module 132_1 of the server device 130 may provide a registration token for the first electronic device 110, and the credential management module 112_2 of the first electronic device 110 may generate a login credential corresponding to this time of registration. Specifically, in the embodiment of the disclosure, the login credential is a passwordless credential.

The first electronic device 110 may further provide the registration token and the login credential for the second electronic device 120. Thus, the major logic control module 122_3 of the second electronic device 120 may notice the user by the display 126 displaying a user interface including a biometrics verification request screen, so as to prompt the user performs the biometric verification on the biometric sensor 127. In the embodiment of the disclosure, the biometric sensor 127 may be, for example, a fingerprint sensor, a palmprint sensor, a face recognition sensor, or an iris recognition sensor. When the biometric identification is pass, the second electronic device 120 may provide the registration token for the server device 130, therefore the major logic control module 132_3 of the server device 130 may compare the registration token sent to the first electronic device 110 and the registration token received from the second electronic device 120 are same registration token to confirm the registration. Therefore, the user may perform the login operation on the first electronic device 110 to login to the first electronic device 110 through the biometric verification of the second electronic device 120, and the user does not need to input any password into the first electronic device 110 or the second electronic device 120. The operating system 100 can provide an effective and fast automatic login mechanism.

In addition, in the embodiment of the disclosure, the processors 111, 121, and 131 may each be a Central Processing Unit (CPU), a microprocessor, a Digital Signal Processor (DSP), Programmable Logic Controller (PLC), an Application Specific Integrated Circuit (ASIC), a System on Chip (SoC), or other similar elements, or a combination of the above elements, and the present disclosure is not limited thereto. In the embodiment of the disclosure, the memories 112, 122, and 132 may each be a Dynamic Random Access Memory (DRAM), a flash memory or a Non-Volatile Random Access Memory (NVRAM), and the present disclosure is also not limited thereto. The type of the processors 111, 121, and 131 and the memories 112, 122, and 132 are respectively determined according to the types of electronic devices.

Figure 2:
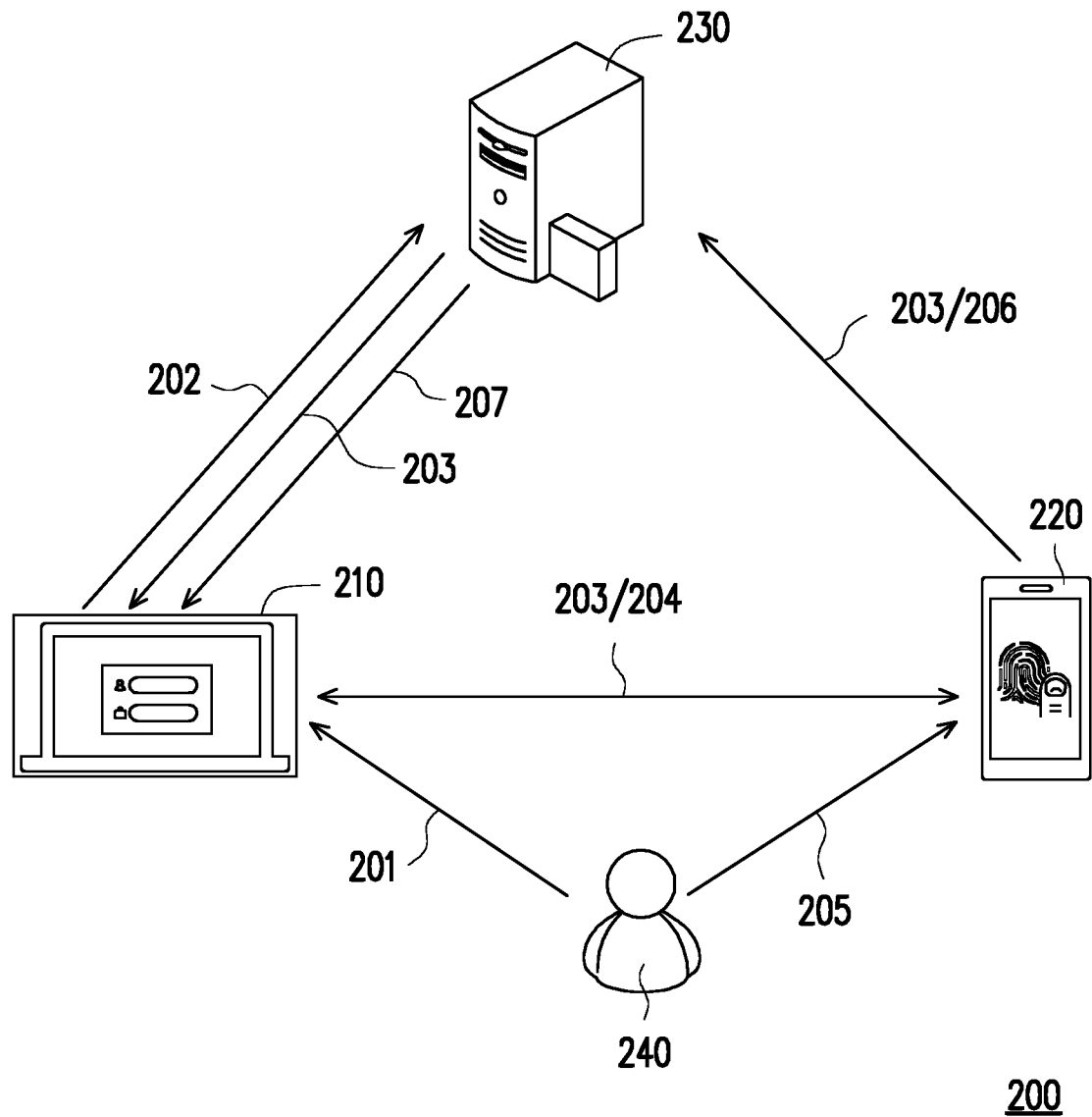
FIG. 2 is a communication schematic diagram illustrating an operating system that performs a registration operation according to an embodiment of the disclosure.
Figure 3:
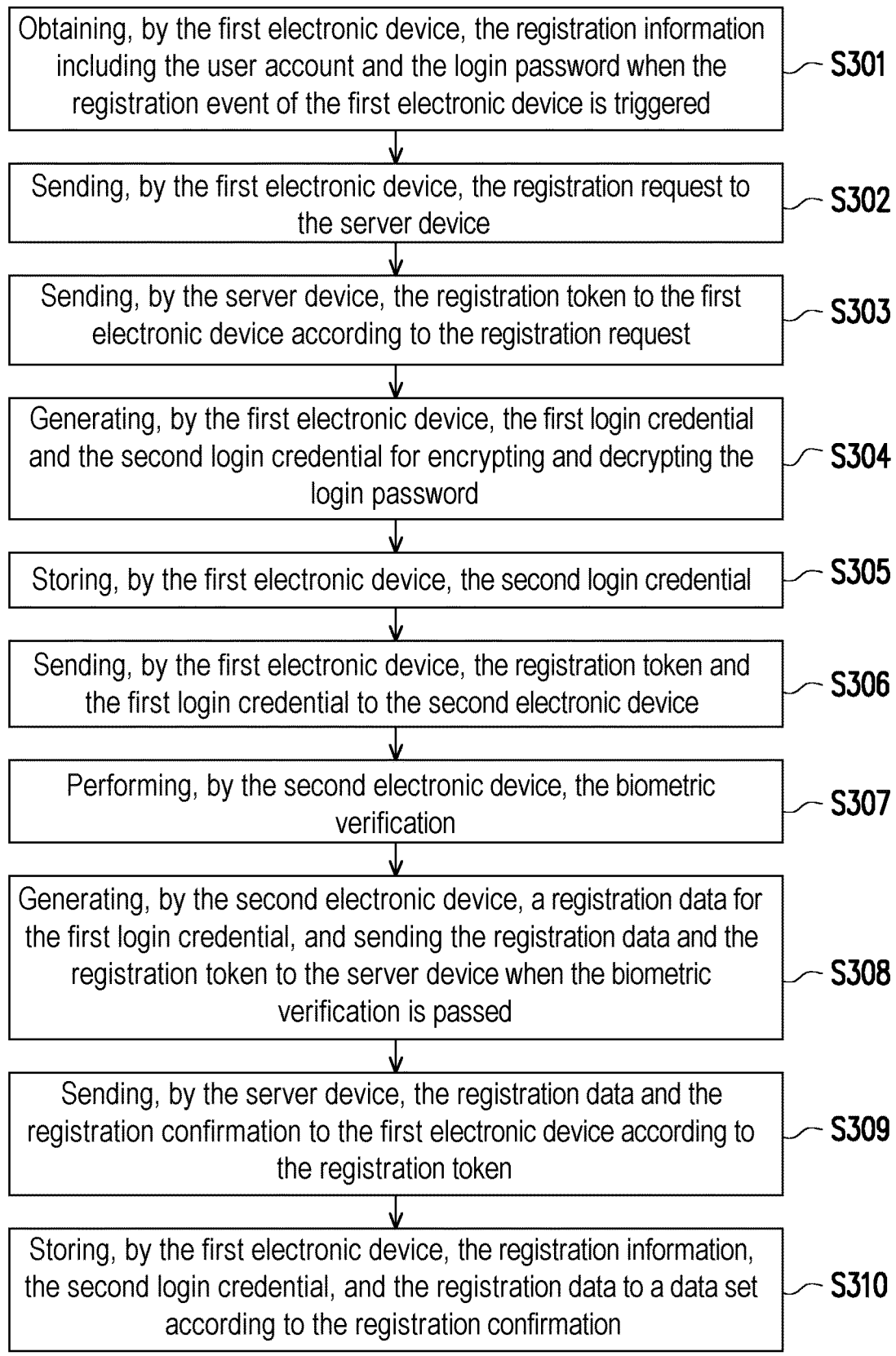
FIG. 3 is a flowchart illustrating an identity registration method according to an embodiment of the disclosure.

FIG. 2 is a communication schematic diagram illustrating an operating system that performs a registration operation according to an embodiment of the disclosure. FIG. 3 is a flowchart illustrating an identity registration method according to an embodiment of the disclosure. Referring to FIG. 2 and FIG. 3, the operation system 200 includes a first electronic device 210, a first electronic device 210, and a server device 230. The first electronic device 210 may be a notebook computer, the second electronic device 220 may be a mobile phone with fingerprint verification function, and the server device 130 may be a cloud server. The first electronic device 210, the second electronic device 220, and the server device 230 may have the internal device features of the first electronic device 110, the second electronic device 120, and the server device 130 of FIG. 1. The operation system 200 may perform the following steps S301 to S310 to implement the registration operation.

In step S301, when a registration event of the first electronic device 210 is triggered, the first electronic device 210 receives a registration information 201 including a user account and a login password. The first electronic device 210 may display a login screen for the user 240 to input the user account and the login password, and the first electronic device 210 may communicate with the server device 230 through an internet. In step S302, the first electronic device 210 may send a registration request 202 to the identity management module of the server device 230. In step S303, the server device 230 may send a registration token 203 to the first electronic device 210 according to the registration request 202. The registration token 203 is provided by the identity management module of the server device 230. Then, in step S304, the first electronic device 210 may generate a first login credential 204 and a second login credential for encrypting and decrypting the login password. In the embodiment of the disclosure, the second electronic device 220 generates a public key and a private key according to an asymmetric encryption mechanism, such as a public key infrastructure (PKI), and the second electronic device 220 provides the public key and the private key to the first electronic device 210. In the embodiment of the disclosure, the first electronic device 210 stores the private key into the first login credential 204, and encrypts the login password to serve as the second login credential by the public key. The first electronic device 210 stores the second login credential, and transmits the first login credential 204 to the second electronic device 220, so that the second electronic device 220 can store and protect the private key.

In step S305, the first electronic device 210 may store the second login credential. In step S306, the first electronic device 210 may send the registration token 203 and the first login credential 204 to the second electronic device 220. The registration token 203 and the first login credential 204 are provided by the credential management module of the first electronic device 210, and the registration token 203 will be linked reference to a first login credential 204. In step S307, the second electronic device 220 may perform the biometric verification 205 (fingerprint verification) through a biometric sensor (fingerprint sensor) of the second electronic device 220. The second electronic device 220 may display a user interface including a biometrics verification request screen to prompt the user 240 to perform the biometric verification 205 through the biometric sensor.

In step S308, when the biometric verification is passed, the second electronic device 220 may generate a registration data 206 for the first login credential 204, and send the registration data 206 and the registration token 203 to the server device 230. The registration data 206 is generated by the credential management module of the second electronic device 220, and the credential management module of the second electronic device 220 may associate the first login credential 204 with biometric verification data of the biometric verification. In step S309, the server device 230 may send the registration data 206 and a registration confirmation 207 to the first electronic device 210 according to the registration token 203. The identity management module of the server device 230 may compare the registration token 203 sent to the first electronic device 210 and the registration token 203 received from the second electronic device 220 are same registration token to confirm whether the registration is successful. In other embodiments of the disclosure, the server device 230 further receives a user account sent from the first electronic device 210, and the server device 210 sends the registration confirmation 207 to the first electronic device 210 according to the registration token 203 and whether the user account matches a pre-stored user account.

In step S310, the first electronic device 210 may merge and store the registration information 201, the second login credential 204, and the registration data 206 to a data set according to the registration confirmation 207. Therefore, the user 240 can effectively register on the first electronic device 210, and the first electronic device 210, the second electronic device 220 and the server device 230 may also store the registration data 206 respectively. More importantly, the registration information 201 including the user account and the login password be securely stored in the first electronic device 210, and the registration information 201 will not be sent to the second electronic device 220 and the server device 230.

It should be noted that, when user 240 executes the login operation, the second electronic device 220 generates a new public key and a new private key, and transmits the first login credential 204, the new public key and the new private key to the first electronic device 210. Then, the first electronic device 210 uses the private key stored in the first login credential 204 to decrypt the second login credential to obtain the login password. After the first electronic device 210 successfully logs in, for example, the operation system of the first electronic device 210 by the login password, the first electronic device 210 stores the new private key into a new first login credential, and encrypts the login password by the new public key to serve as a new second login credential. The first electronic device 210 stores the new second login credential, and transmits the new first login credential to the second electronic device 220, so that the second electronic device 220 stores and protects the new private key. In other words, since the second electronic device 220 changes the public key and the private key after each login event, the login password can be effectively protected. In other embodiments of the disclosure, the above public key and the above private key may be generated by a symmetric encryption mechanism, so that the first electronic device 210 uses a secret key to encrypt the login password into the first login credential 204, and the first electronic device 210 stores the secret key into the second login credential. Moreover, the second electronic device 220 also changes the secret key after each login event, so as to effectively protect the login password.

Figure 4:
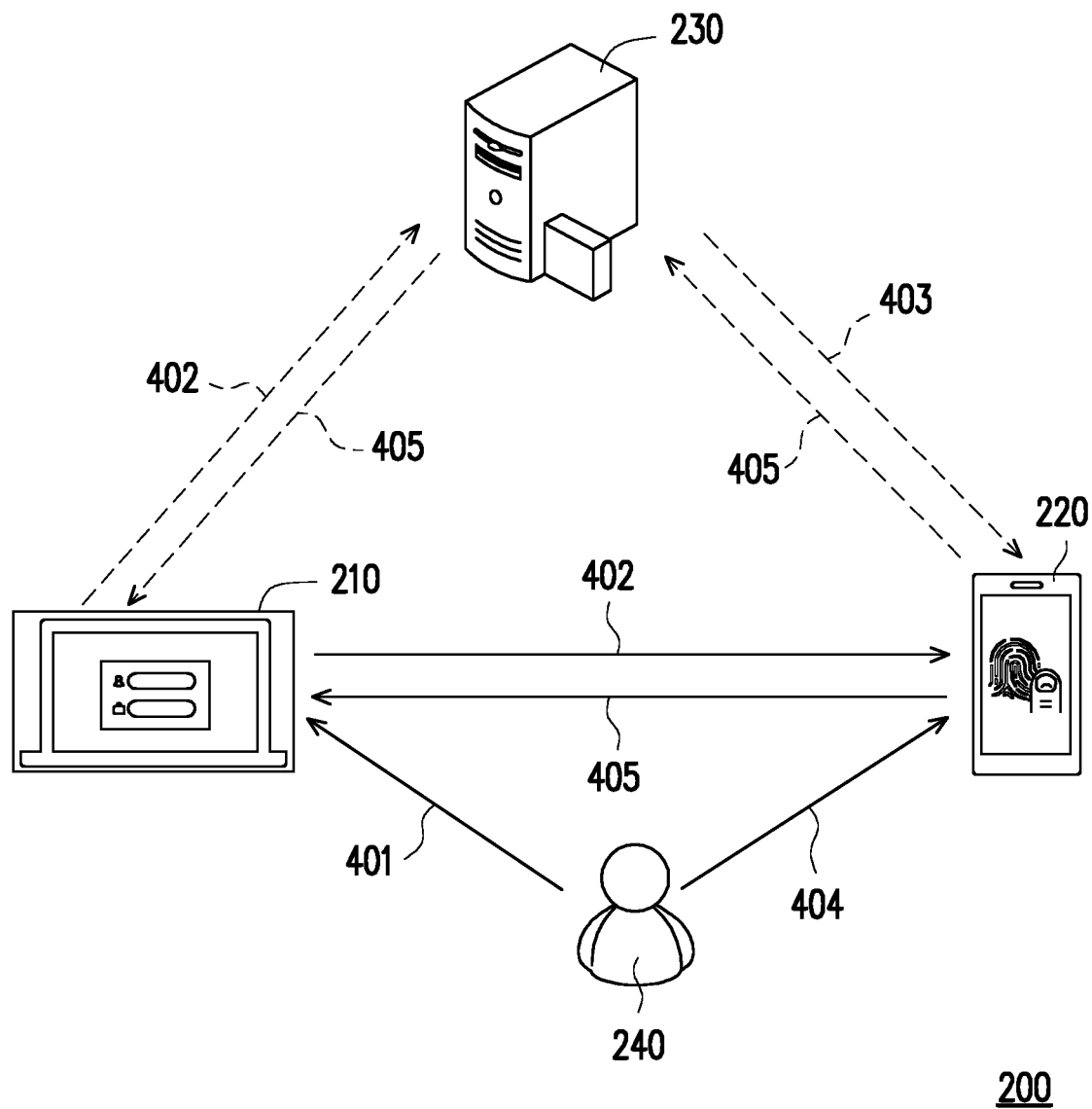
FIG. 4 is a communication schematic diagram illustrating an operating system that performs automatic login according to an embodiment of the disclosure.
Figure 5:
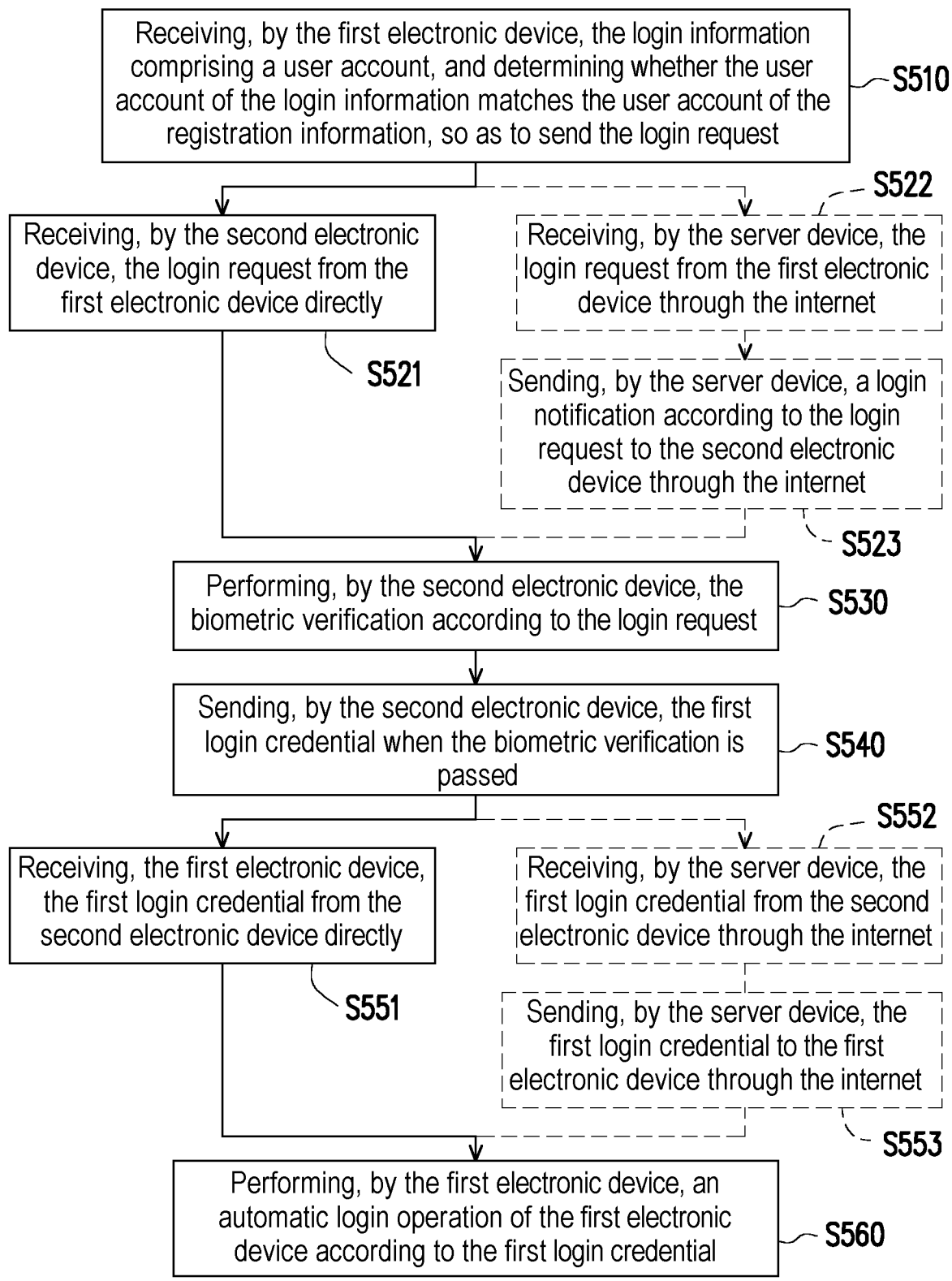
FIG. 5 is a flowchart illustrating an automatic login method according to an embodiment of the disclosure.

FIG. 4 is a communication schematic diagram illustrating an operating system that performs automatic login according to an embodiment of the disclosure. FIG. 5 is a flowchart illustrating an automatic login method according to an embodiment of the disclosure. Referring to FIG. 4 and FIG. 5, after the registration operation of the above embodiment, the operation system 200 may perform the following steps S510 to S560 to implement the login operation. In step S510, the first electronic device 210 receives a login information 401 including a user account from the user 240, and determines whether the user account of the login information 401 matches the user account of the registration information (for example, the registration information 201 of FIG. 2), so as to send the login request 402. The login request 402 may be provided by the major logic control module of the first electronic device 210. In the embodiment of the disclosure, when a login event of the first electronic device 210 is triggered, the first electronic device 210 may try to communicate with the second electronic device 220 through the wireless communication, or to communicate with the server device 230 through the internet. It should be noted that, the first electronic device 210 may be design to send the login request 402 to at least one of the second electronic device 220 and the server device 230. In the embodiment of the disclosure, if the first electronic device 210 communicates with the second electronic device 220 before communicating with the server device 230, or the first electronic device 210 is design to send the login request 402 to the second electronic device 220, then in step S521, the second electronic device 220 receives the login request 402 from the first electronic device 210 directly. However, in other embodiments of the disclosure, if the first electronic device 210 communicates with the server device 230 before communicating with the second electronic device 220, or the first electronic device 210 is design to send the login request 402 to the server device 230, then in step S522, the server device 230 receives the login request 402 from the first electronic device 210 through the internet. In step S523, the server device 230 sends a login notification 403 according to the login request 402 to the second electronic device 220 through the internet. The major logic control module of the server device 230 may receive the login request 402 from the first electronic device 210, and then generate and transmit the login notification 403 to the second electronic device 220 according to the login request 402. In other words, the first electronic device 210 may send the login request 402 to the second electronic device 220 directly or via the server device 230.

In the embodiment of the disclosure, the major logic control module of the second electronic device 220 may request the second electronic device 220 to drive the biometric sensor for biometric sensing according to the login request 402 or the login notification 403. In step S530, the second electronic device 220 performing the biometric verification 404 according to the login request 402. In the embodiment of the disclosure, the second electronic device 220 may display a user interface including a biometrics verification request screen to prompt the user 240 to perform the biometric verification 404 (fingerprint verification) through the biometric sensor (fingerprint sensor). In step S540, when the biometric verification 404 is passed, the second electronic device 220 may send the first login credential 405. The first login credential 405 may be provided by the credential management module of the second electronic device 220 according to the biometric verification 404. In the embodiment of the disclosure, the first login credential 405 is a passwordless credential as the above embodiments of FIG. 2 and FIG. 3, but the present disclosure is not limited thereto. It should be noted that, the second electronic device 220 may be designed to send the first login credential 405 to at least one of the first electronic device 210 and the server device 230. In the embodiment of the disclosure, if the second electronic device 220 is designed to send the first login credential 405 to the first electronic device 210, then in step S551, the first electronic device 210 receives the first login credential 405 from the second electronic device 220 directly. However, in other embodiments of the disclosure, if the second electronic device 220 is designed to send the first login credential 405 to the server device 230, then in step S552, the server device 230 receives the first login credential 405 from the second electronic device 220 through the internet. In step S553, the server device 230 sends the first login credential 405 to the first electronic device 210 through the internet. The major logic control module of the server device 230 may receive the first login credential 405 from the second electronic device 220, and then transmit the first login credential 405 to the first electronic device 210. In other words, when the biometric verification 404 is passed, the second electronic device 220 sends the first login credential 405 to the first electronic device 210 directly or via the server device 230.

In step S560, the first electronic device 210 performs an automatic login operation of the first electronic device 210 according to the first login credential. In the embodiment of the disclosure, the first electronic device 210 uses the private key (or the secret key) contained in the first login credential 405 to decrypt the second login credential to obtain the login password. Thus, the first electronic device 210 uses the login password to perform the automatic login of the first electronic device 210. Therefore, in the embodiment of the disclosure, the user 240 only needs to input the user account into the first electronic device 210 to trigger the login event, and the user 240 does not need to input any password during the login operation. The user 240 can safely, quickly, and automatically login to the first electronic device 210 through the biometric verification 404 of the second electronic device 220.

In addition, when the biometric verification 404 is passed, the second electronic device 220 also sends a new public key and a new private key (or a new secret key) to the first electronic device 210 directly or via the server device 230. After the step S560, the first electronic device 210 may encrypt the login password by the new public key to serve as a new second login credential, and store the new private key into a new first login credential. The first electronic device 210 may store the new second login credential, and transmit the new first login credential to the second electronic device 220 directly or via the server device 230.

Figure 6:
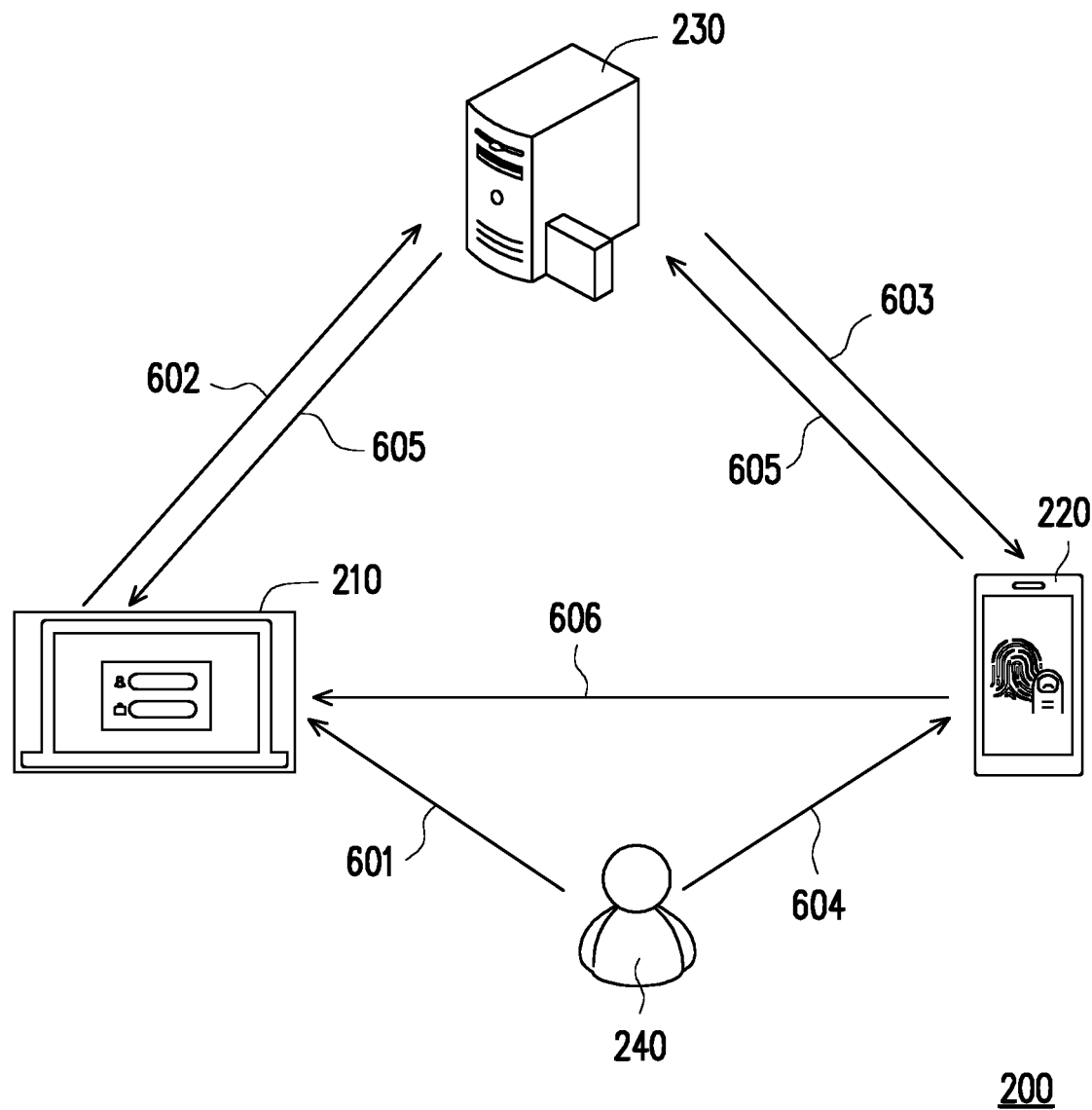
FIG. 6 is a communication schematic diagram illustrating an operating system that performs automatic login according to another embodiment of the disclosure.
Figure 7:
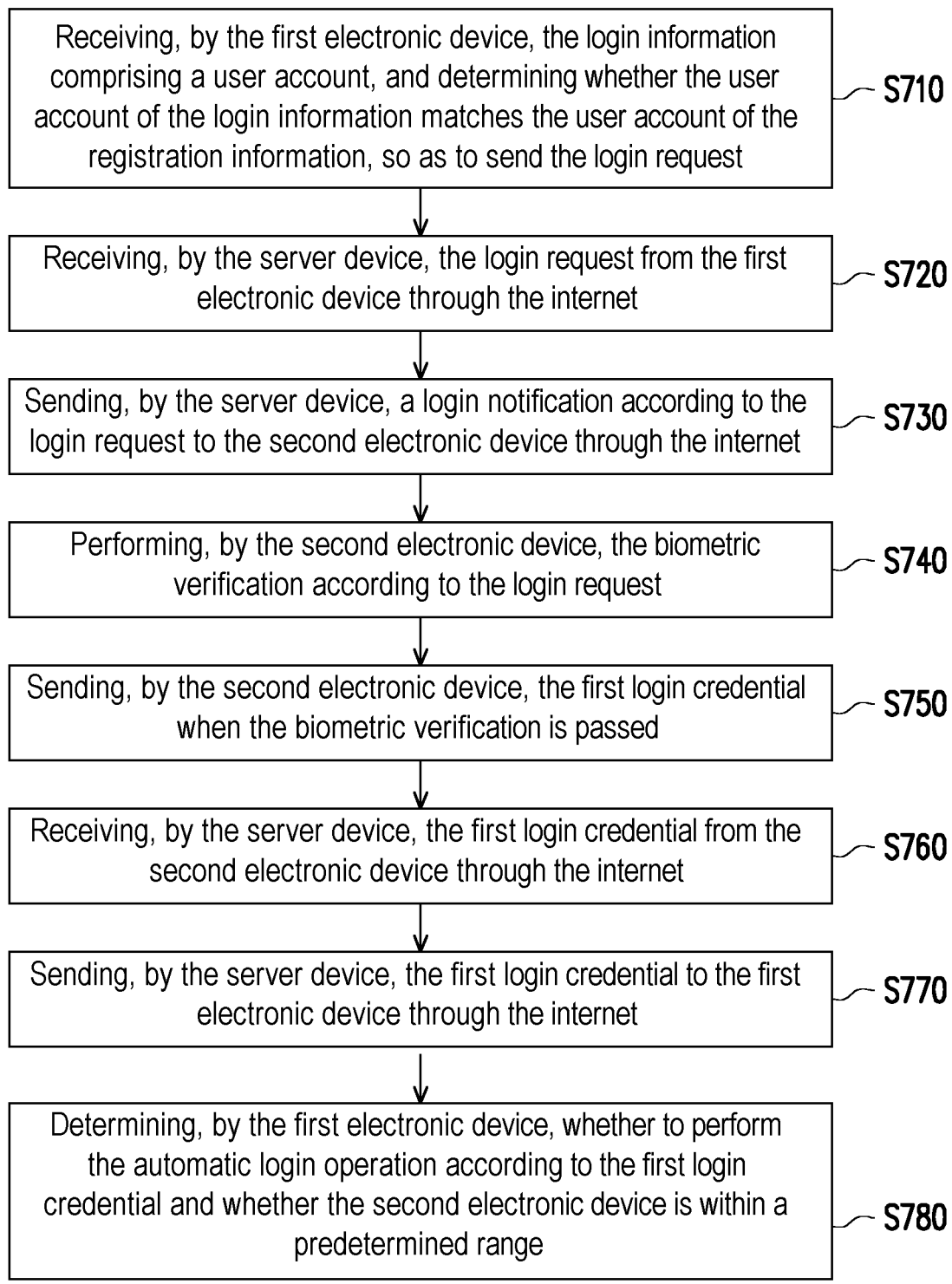
FIG. 7 is a flowchart illustrating an automatic login method according to another embodiment of the disclosure.

FIG. 6 is a communication schematic diagram illustrating an operating system that performs automatic login according to another embodiment of the disclosure. FIG. 7 is a flowchart illustrating an automatic login method according to another embodiment of the disclosure. Referring to FIG. 6 and FIG. 7, after the registration operation of the above embodiment, the operation system 200 may perform the following steps S710 to S780 to implement the login operation. In step S710, the first electronic device 210 receives a login information 601 including a user account, and determines whether the user account of the login information 401 matches the user account of the registration information (for example, the registration information 201 of FIG. 2), so as to send the login request 602. The login request 602 may be provided by the major logic control module of the first electronic device 210. In the embodiment of the disclosure, when a login event of the first electronic device 210 is triggered, the first electronic device 210 may try to communicate with the second electronic device 220 through the wireless communication, and to communicate with the server device 230 through the internet. It should be noted that, comparing with the above embodiment of FIG. 4, the first electronic device 210 may be designed to only send the login request 602 to the server device 230. That is, considering the security of data transmission, under certain operating scenarios, the security of data transmission via network communication may be higher than that of wireless communication. Thus, in step S720, the server device 230 receives the login request 602 from the first electronic device 210 through the internet. In step S730, the server device 230 sends a login notification 603 according to the login request 602 to the second electronic device 220 through the internet. The major logic control module of the server device 230 may receive the login request 602 from the first electronic device 210, and then generate and transmit the login notification 603 to the second electronic device 220 according to the login request 602.

In the embodiment of the disclosure, the major logic control module of the second electronic device 220 may request the second electronic device 220 to drive the biometric sensor for biometric sensing according to the login notification 603. In step S740, the second electronic device 220 performing the biometric verification 604 according to the login notification 603. In the embodiment of the disclosure, the second electronic device 220 may display a user interface including a biometrics verification request screen to prompt the user 240 to perform the biometric verification 604 (fingerprint verification) through the biometric sensor (fingerprint sensor). In step S750, when the biometric verification 604 is passed, the second electronic device 220 may send the first login credential 605. The first login credential 605 may be provided by the credential management module of the second electronic device 220 according to the biometric verification 604. In the embodiment of the disclosure, the first login credential 605 is a passwordless credential as the above embodiments of FIG. 2 and FIG. 3, but the present disclosure is not limited thereto. It is should be noted that, comparing with the above embodiment of FIG. 4, the second electronic device 220 may be design to only send the first login credential 605 to the server device 230. Thus, in step S760, the server device 230 receives the first login credential 605 from the second electronic device 220 through the internet. In step S770, the server device 230 sends the first login credential 605 to the first electronic device 210 through the internet. The major logic control module of the server device 230 may receive the first login credential 605 from the second electronic device 220, and then transmit the first login credential 605 to the first electronic device 210.

In step S780, the first electronic device 210 determines whether to perform the automatic login operation according to the first login credential 605 and whether the second electronic device 220 is within a preset range. In the embodiment of the disclosure, the credential management module of the first electronic device 210 may read registration data (for example, the registration data 206 of FIG. 2) to read the second login credential (for example, the second login credential previously stored in the first electronic device 210), and may determine whether the first login credential 605 matches (or equals to) the second login credential to verify the first login credential 605. Furthermore, the first electronic device 210 may further collect the wireless communication signal information 606 (for example, a Bluetooth communication signal or a Wi-Fi communication signal) of the second electronic device 220 to determine the positioning coordinate of the second electronic device 220 (for example, obtained through a global positioning system (GPS) or a location based service (LBS)), and calculate a distance between a first positioning coordinate of the first electronic device 210 and the second positioning coordinate of the second electronic device 220. Thus, the first electronic device 210 may determine whether the second electronic device 220 is within the preset range according to whether the distance between a first positioning coordinate of the first electronic device 210 and the second positioning coordinate of the second electronic device 220 is less than a preset distance. However, in other embodiments of the disclosure, the preset range may be a farthest distance that the first electronic device 210 can receive the wireless communication signal of the second electronic device 220.

In the embodiment of the disclosure, when the first electronic device 210 determines the second electronic device 220 is within the preset range, the first electronic device 210 uses the private key (or the secret key) contained in the first login credential 605 to decrypt the second login credential to obtain the login password. The first electronic device 210 uses the login password to perform the automatic login of the first electronic device 210. Therefore, the user 240 only needs to input the user account into the first electronic device 210 to trigger the login event, and the user 240 does not need to input any password during the login operation. Moreover, since the first electronic device 210 of the embodiment will only perform the automatic login operation when the second electronic device 220 is close to the first electronic device 210 and first login credential 605 is verified, the operating system 200 can prevent the second electronic device 220 from being stolen and perform remote login. The user 240 may hold the second electronic device 220 and approach the first electronic device 210 to safely, quickly, and automatically login to the first electronic device 210 through the biometric verification 604 of the second electronic device 220.

In addition, when the biometric verification 604 is passed, the second electronic device 220 also sends a new public key and a new private key (or a new secret key) to the first electronic device 210 via the server device 230, and the first electronic device 210 may encrypt the login password by new public key to serve as a new second login credential, and store the new private key into a new first login credential. The first electronic device 210 may store the new second login credential, and transmit the new first login credential to the second electronic device 220 via the server device 230.

In summary, the operating system with automatic login mechanism and the automatic login method of the disclosure are capable of providing safely and quickly login mechanism. The user may perform the login operation on an electronic device to login to the electronic device through the biometric verification of another electronic device, wherein the user only needs to input the user account into the electronic device to trigger the login event, and the user does not need to input any password to the electronic device and the another electronic device during the login operation. Therefore, the operating system with automatic login mechanism and the automatic login method of the disclosure can provide a safely, quickly, and automatically password-free login function.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An operating system with automatic login mechanism, comprising:
   a first electronic device;
   a second electronic device, coupled to the first electronic device, and comprising a biometric sensor; and
   a server device, coupled to the first electronic device and the second electronic device,
   wherein when a login event of the first electronic is triggered, the first electronic device sends a login request to the second electronic device directly or via the server device, so that the second electronic device performs a biometric verification by the biometric sensor according to the login request,
   wherein when the biometric verification is passed, the second electronic device sends a first login credential to the first electronic device directly or via the server device, so that the first electronic device performs an automatic login operation of the first electronic device according to the first login credential,
   wherein the first electronic device generates the first login credential and a second login credential for encrypting and decrypting a login password,
   wherein the first login credential comprises a private key, and the second login credential comprises the login password encrypted by a public key, wherein the public key and the private key are generated by the second electronic device according to an asymmetric encryption mechanism.

2. The operating system according to the claim 1, wherein a first wireless communication module of the first electronic device communicates with a second wireless communication module of the second electronic device, and the second electronic device directly receives the login request from the first electronic device.

3. The operating system according to the claim 1, wherein a first wireless communication module of the first electronic device communicates with a second wireless communication module of the second electronic device, and the first electronic device directly receives the first login credential from the second electronic device.

4. The operating system according to the claim 1, wherein the server device respectively communicates with the first electronic device and the second electronic device through an internet, the server device receives the login request from the first electronic device through the internet, and the server device sends a login notification according to the login request to the second electronic device through the internet.

5. The operating system according to the claim 1, wherein the server device respectively communicates with the first electronic device and the second electronic device through an internet, the server device receives the first login credential from the second electronic device through the internet, and the server device sends the first login credential to the first electronic device through the internet.

6. The operating system according to the claim 1, wherein after the first electronic device receives the first login credential, the first electronic device determines whether to perform the automatic login operation according to the first login credential and whether the second electronic device is within a preset range.

7. The operating system according to the claim 6, the first electronic device determines whether the second electronic device is within the preset range according to whether a distance between a first positioning coordinate of the first electronic device and a second positioning coordinate of the second electronic device is less than a preset distance.

8. The operating system according to the claim 6, wherein the preset range is a farthest distance that the first electronic device can receive a wireless communication signal of the second electronic device.

9. The operating system according to the claim 1, wherein the first electronic device obtains login information comprising a user account, and the first electronic device determines whether the user account of the login information matches a user account of registration information to trigger the login event,
   wherein the first electronic device decrypts the second login credential by the first login credential to obtain the login password of the registration information corresponding to the user account, so that the first electronic device performs the automatic login operation by using the login password.

10. The operating system according to the claim 9, wherein the second electronic device changes the public key and the private key after each login event.

11. The operating system according to the claim 9, wherein the first login credential comprises a secret key, and the second login credential comprises the login password encrypted by the secret key, wherein the secret key is generated by the second electronic device according to a symmetric encryption mechanism, and the second electronic device changes the public key and the private key after each login event.

12. The operating system according to the claim 9, wherein when a registration event of the first electronic device is triggered, the first electronic device obtains the registration information comprising the user account and the login password, and the first electronic device sends a registration request to the server device,
   wherein the server device sends a registration token to the first electronic device according to the registration request, and the first electronic device stores the second login credential and sends the registration token and the first login credential corresponding to the registration information to the second electronic device, so that the second electronic device performs another biometric verification by the biometric sensor.

13. The operating system according to the claim 12, wherein when the another biometric verification is passed, the second electronic device generates a registration data for the second login credential, and sends the registration token and the registration data to the server device,
   wherein the second electronic device associates the first login credential with biometric verification data of the another biometric verification, and the server device sends the registration data and a registration confirmation to the first electronic device according to the registration token, so that the first electronic device merges and stores the registration information, the second login credential, and the registration data to a data set according to the registration confirmation.

14. The operating system according to the claim 13, wherein the server device further receives a user account sent from the first electronic device, and the server device sends the registration confirmation to the first electronic device according to the registration token and whether the user account matches a pre-stored user account.

15. An automatic login method, comprising:
- sending, by the first electronic device, a login request to the second electronic device directly or via the server device when a login event of the first electronic device is triggered;
- performing, by the second electronic device, a biometric verification according to the login request;
- sending, by the second electronic device, a first login credential to the first electronic device directly or via the server device when the biometric verification is passed;
- performing, by the first electronic device, an automatic login operation of the first electronic device according to the first login credential; and
- generating, by the first electronic device, the first login credential and a second login credential for encrypting and decrypting a login password,
- wherein the first login credential comprises a private key, and the second login credential comprises the login password encrypted by a public key, wherein the public key and the private key are generated by the second electronic device according to an asymmetric encryption mechanism.

16. The automatic login method according to the claim 15, wherein the step of performing, by the first electronic device, the automatic login operation of the first electronic device according to the first login credential comprises:
- determining, by the first electronic device, whether to perform the automatic login operation according to the first login credential and whether the second electronic device is within a preset range after the first electronic device receives the first login credential.

17. The automatic login method according to the claim 15, wherein the first electronic device obtains login information comprising a user account, and the first electronic device determines whether the user account of the login information matches a user account of registration information to trigger the login event,
- wherein the first electronic device decrypts the second login credential by the first login credential to obtain the login password of the registration information corresponding to the user account, so that the first electronic device performs the automatic login operation by using the login password.

18. The automatic login method according to the claim 17, wherein the second electronic device changes the public key and the private key after each login event.

19. The automatic login method according to the claim 17, wherein the first login credential comprises a secret key, and the second login credential comprises the login password encrypted by the secret key, wherein the secret key is generated by the second electronic device according to a symmetric encryption mechanism, and the second electronic device changes the public key and the private key after each login event.

20. The automatic login method according to the claim 17, further comprising:
- obtaining, by the first electronic device, the registration information comprising the user account and the login password when a registration event of the first electronic device is triggered;
- sending, by the first electronic device, a registration request to the server device;
- sending, by the server device, a registration token to the first electronic device according to the registration request;
- storing, by the first electronic device, the second login credential;
- sending, by the first electronic device, the registration token and the first login credential corresponding to the registration information to the second electronic device; and
- performing, by the second electronic device, another biometric verification by the biometric sensor.

* * * * *